United States Patent
Jang et al.

(10) Patent No.: US 8,530,613 B2
(45) Date of Patent: Sep. 10, 2013

(54) PREPARATION OF MESO-POROUS POLYMER BASED NANO-POLYMERIZED COMPOSITE MATERIAL

(75) Inventors: Hyun tae Jang, Chungcheongnam-do (KR); Wang seog Cha, Seoul (KR); Ji yun Lee, Nam-gu Incheon (KR); Bhagiyalakshmi Markandan, Chungcheongnam-do (KR); Anuradha Ramani, Chungcheongnam-do (KR); Hwa young Lee, Nam-gu Incheon (KR); Joo boo Lee, Seoul (KR); Sung yong Lee, Nam-gu Incheon (KR)

(73) Assignee: Hanseo University Industry Academic Cooperation (KR)

( * ) Notice: Subject to any disclaimer, the term of this patent is extended or adjusted under 35 U.S.C. 154(b) by 225 days.

(21) Appl. No.: 13/120,281

(22) PCT Filed: Nov. 4, 2009

(86) PCT No.: PCT/KR2009/006468
§ 371 (c)(1),
(2), (4) Date: Mar. 22, 2011

(87) PCT Pub. No.: WO2011/034250
PCT Pub. Date: Mar. 24, 2011

(65) Prior Publication Data
US 2011/0172084 A1 Jul. 14, 2011

(51) Int. Cl.
*C08G 75/00* (2006.01)
*B05D 3/02* (2006.01)

(52) U.S. Cl.
USPC .......................................... 528/377; 427/384

(58) Field of Classification Search
USPC ....................................................... 528/380
See application file for complete search history.

(56) References Cited

FOREIGN PATENT DOCUMENTS

| KR | 100764613 |   | 1/2007 |
|---|---|---|---|
| KR | 100764613 | * | 10/2007 |

OTHER PUBLICATIONS

Rajesh A. Khatri, Steven S.C. Chuang, Yee Soong, and McMahan Gray; Carbon Dioxide Capture by Diamine-Grafted SBA-15: A Combined Fourier Transform Infrared and Mass Spectrometry Study; Ind. Engl Chem. Res. 2005, 44, 3702-3708.
M.L. Gray, Y. Soong, K.J. Champagen, John Baltrus, R.W> Stevens, Jr., P. Toochinda, S.S.C. Chuang, "CO2 Capture by Amine-Enriched Fly Ash Carbon Sorbents", www.elsevier.com/locate/seppur, 2004 31-36.
Rajesh A. Khatri, Steven S.C. Chuang, Yee Soong, and McMahan Gray; 2005.

* cited by examiner

*Primary Examiner* — Hui Chin
(74) *Attorney, Agent, or Firm* — Dwayne E. Rogge; Schacht Law Office, Inc.

(57) ABSTRACT

Disclosed herein is a method for preparation of a meso-porous polymer nano-composite material which includes: drying a solid material having pores under vacuum; adding a first organic solvent to the vacuum dried solid material in the reactor and dispersing the first organic solvent in pores of the solid material; adding a constant amount of a material having radicals or functional groups relative to weight of the mixture containing the solid material and the first organic solvent in a reactor, and agitating the mixture; introducing a polymerization initiator into the reactor; using a second organic solvent to filter and wash the reaction product after completion of the polymerization; and drying the treated product to eliminate the second organic solvent from the same after removal of the unreacted material having radicals or functional groups as well as the polymerization initiator from the product.

7 Claims, 3 Drawing Sheets

PREPARATION OF MESO-POROUS POLYMER BASED NANO-POLYMERIZED COMPOSITE MATERIAL

RELATED APPLICATIONS

This application claims priority benefit of PCT/KR2009/006468, filed Sep. 15, 2009, which is in turn based on the Korean national application 10-2009-0087045(KR) also filed Sep. 15, 2009.

BACKGROUND OF THE DISCLOSURE a) Field of the Disclosure

The present invention relates to an adsorbent to adsorb and absorb carbon dioxide (a greenhouse gas), which is the leading cause of global warming, in order to separate the gas, as well as a method for preparation of a polymer nano-composite material having different radicals or functional groups wherein the material may be used to form the adsorbent reactive with heavy metals in order to absorb and adsorb the same, in turn controlling the heavy metals.

b) Background Art

For reduction and treatment of carbon dioxide, absorption, adsorption, membrane separation, and the like as a separation process after combustion (that is, post-combustion separation) have recently been proposed, while a representative example of a separation process before combustion (that is, pre-combustion separation) may comprise decarbonization.

For such post-combustion separation, an absorption process may include using a liquid amine absorbent to absorb carbon dioxide (hereinafter, referred to as '$CO_2$') and separate the same, heating $CO_2$ chemically bonded to an amine group of the absorbent to desorb the same, thus efficiently separating high concentration $CO_2$. Here, the amine absorbent is usually used together with water and material transfer in a carbon dioxide solution may become a factor. Separation of the carbon dioxide solution requires a large amount of energy, owing to oxidation of the amine used during separation, and an additional purification is therefore necessary. Accordingly, it is considered that the foregoing absorption method is very complicated and requires the highest equipment cost among conventionally available methods for $CO_2$ separation. In addition, the absorption method has difficulties in separating $CO_2$ generated from a small $CO_2$ generation source, although advantageously applied to separation of $CO_2$ from a large capacity $CO_2$ generation source.

For use of a high temperature dried adsorbent, Korean Patent No. 10-0899306 for an invention entitled "Calcium based high temperature $CO_2$ absorbent" capable of directly producing high concentration $CO_2$ during separation of $CO_2$ from a dry absorbent, entails disadvantages such as a high processing temperature and increased loss of the dry absorbent due to abrasion.

Meanwhile, the foregoing adsorption method generally utilizes variation in pressure or temperature, or operates a separating process with simultaneous variation in temperature and pressure. A zeolite molecular sieve, activated carbon or a carbon molecular sieve is generally used as the adsorbent herein. The zeolite molecular sieve has high adsorption efficiency but entails a contamination problem caused by other components contained in a combustible gas. The activated carbon shows a lower adsorption rate than zeolite. For physical adsorption, thermal desorption requires a high temperature and, since the adsorption is executed at a high pressure to improve adsorption effect, entails additional energy costs.

In order to enhance $CO_2$ adsorption and separation efficiencies, conventional methods are generally operated at a high pressure and cannot isolate high concentration $CO_2$ by simple separation, instead, separating the same through multiple processing stages. Since a $CO_2$ adsorption amount of an adsorbent is significantly influenced by temperature, the adsorbent is subjected to cooling before a separating process, so as to produce the adsorbent at a relatively low temperature. Moreover, moisture causing considerable decrease in $CO_2$ adsorption must be removed. Consequently, due to the foregoing operation procedures and restrictions thereof, the adsorption method requires considerable energy costs and entails a difficulty in scale-up.

Furthermore, the membrane separation has problems in that currently available separation membranes are relatively expensive, an expensive pre-treatment apparatus for purifying a combustible gas is required, and other costs, for example, costs for replacement and/or purification of a membrane due to contamination thereof are incurred.

DESCRIPTION OF THE PREFERRED EMBODIMENTS

Figure 1:
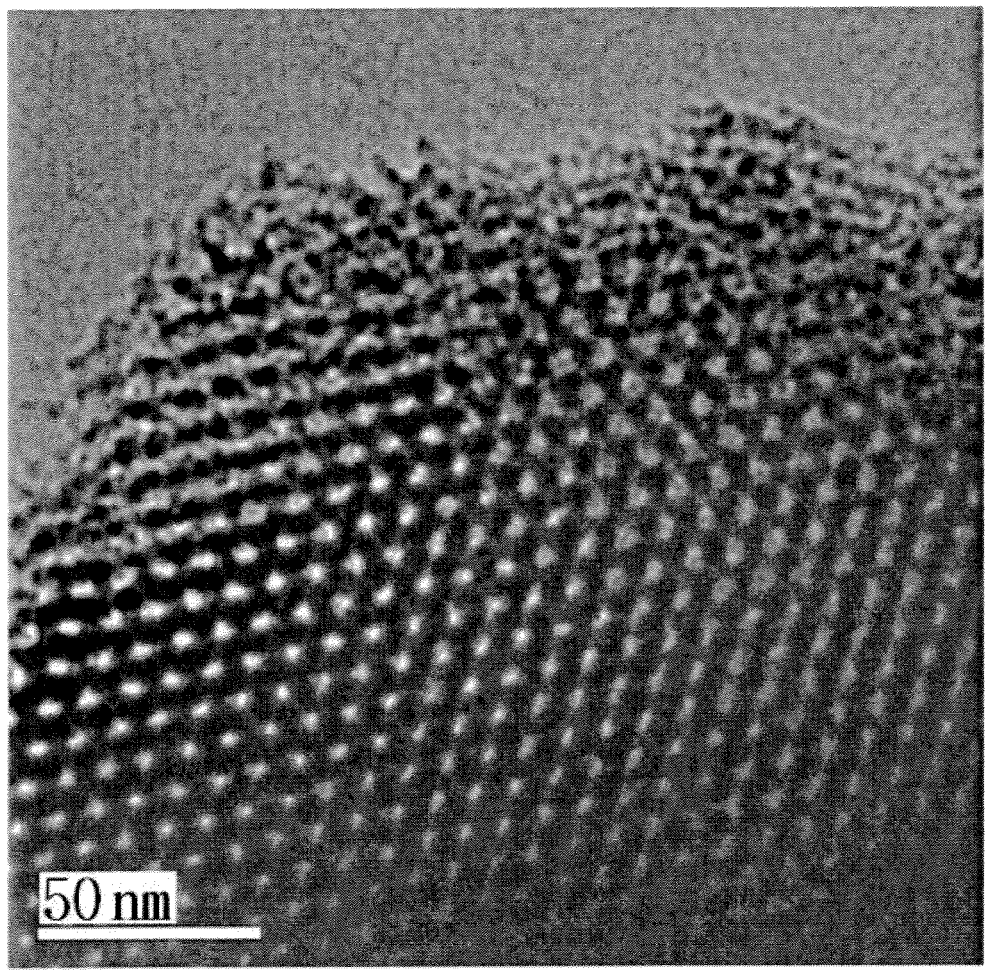
FIG. 1 is a photograph showing morphology of a material prepared by a method for preparation of a meso-porous polymer nano-polymerized composite material according to the present invention.

The present invention is directed to solving conventional problems of the adsorbent described above and an object of the present invention is to provide a method for preparation of a novel material having radicals or functional groups, with beneficial features including, in particular, very little or no variation in $CO_2$ adsorption amount caused by moisture, a higher operation temperature than other physical adsorbents, high adsorption rate even at a temperature of 50 to 80° C. after passage of a device for removal of a pollutant gas in compliance with gas emission regulations, and $CO_2$ desorption attained at less than 110° C., etc., wherein the material may be employed in various applications other than $CO_2$ separation, and used to separate gaseous and/or liquid heavy metals by adsorption and absorption and prepare different catalysts and/or medical products by substitution of the radicals or functional groups contained in the material.

In order to accomplish the above purpose, an exemplary embodiment of the present invention is to provide a method for preparation of a meso-porous polymer nano-polymerized composite material, comprising:

drying a solid material having pores under vacuum at ambient temperature and pressure (S10);

adding 50~99.8 wt. % of a first organic solvent to 0.2~50 wt. % of the vacuum dried solid material and dispersing the first organic solvent in pores of the solid material using an ultrasonicator, in order to remove air while wetting a surface of the solid material with the first organic solvent (S20);

adding 1~90 wt. % of a material having radicals or functional groups to 10~99 wt.% of the mixture containing the solid material and the first organic solvent in a reactor, which was prepared in the above step S20, and agitating the mixture for 10 to 20 minutes (S30);

introducing a polymerization initiator into the reactor containing the mixture prepared in the above step S30 to initiate polymerization of the mixture for 10 minutes to 100 hours while maintaining a surface temperature of the reactor at −20~100° C. (S40);

using a second organic solvent to filter and wash the reaction product after completion of the polymerization, in order to remove the unreacted material having radicals or functional groups as well as the polymerization initiator from the product (S50); and drying the treated product to eliminate the second organic solvent from the same after removal of the unreacted material having radicals or functional groups as well as the polymerization initiator (S60).

According to the preferred embodiment of the present invention, a variety of meso-porous structures are used and a material having radicals or functional groups may be applied to the structure in order to graft or coat pores in the structure or a surface of the structure. As a result, such radicals or functional groups are present on surfaces of inner/outer walls of the meso-porous structure. In particular, according to the present invention, the material having radicals or functional groups may be polymerized then present inside/outside the meso-porous structure. Hereinafter, the following description will be given of the foregoing technical configurations of the present invention in terms of processing stages.

Drying of porous solid material S10

A solid material used in the present invention has pores and is prepared using at least one selected from silica, carbon substances, a zeolite molecular sieve, alumina and zirconia. More particularly, the solid material may be prepared using meso-porous carbon having a specific surface area of 300 to 3,000 m2/g and an average pore diameter of 1.5 to 30.0 nm.

Such a porous solid material is subjected to vacuum drying at ambient temperature and pressure. Without vacuum drying of the solid material, a material adsorbed on a surface of the solid material decreases monomer dispersion, in turn reducing a degree of polymerization or not driving polymerization. However, when subjecting the solid material to vacuum drying, uniform dispersion inside the pores and a suitable degree of polymerization may be attained.

Dispersion of the first organic solvent into pores of solid material S20

In a reactor containing 0.2 to 50 wt. % of the vacuum dried solid material prepared in the above stage S10, 50 to 99.8 wt. % of a first organic solvent is introduced. Using an ultrasonicator, the first organic solvent is dispersed in the pores of the solid material to remove air and wet a surface of the solid material with the first organic solvent.

When an amount of the solid material is less than 0.2 wt. %, significant pore clogging and polymerization may occur by lack of the solid material. On the other hand, if the amount exceeds 50 wt. %, a degree of dispersion of polymerizable monomers is reduced due to excess solid material, in turn causing insufficient polymerization. Accordingly, an amount of the solid material used in the present invention may range from 0.2 to 50 wt. % relative to the first organic solvent.

The first organic solvent may include, for example, at least one selected from a group consisting of acetonitrile ($CH_3CN$), acetone, chloroform, dimethylchloride, methylethylketone, methanol, toluene, xylene, isopropyl alcohol, propanol, n-propyl acetate and ether.

When an amount of the first organic solvent used in the present invention is less than 50 wt. %, mixing between the monomers and the solid material is decreased and dispersion is not sufficient. On the other hand, if an amount of the first organic solvent exceeds 99.8 wt. %, both the monomer and the solid material have a low concentration, thus decreasing a degree of polymerization whereas extending a reaction time thereof. Therefore, an amount of the first organic solvent used in the present invention may range from 50 to 99.8 wt. % relative to the solid material.

Further, using an ultrasonicator may enable uniform dispersion of the organic solvent in pores of a meso-porous material wherein a gas contained in the pores is exchanged with the organic solvent by ultrasound and washing effects may also be obtained by the organic solvent.

If the ultrasonicator is not employed, a substantially long time is required to disperse the organic solvent in the pores. Therefore, ultrasonication under vacuum is preferably utilized to attain more even dispersion. That is, sufficient dispersion of the organic solvent in pores cannot be achieved unless ultrasound is used or the process is executed under vacuum.

Agitation of mixture with amine-containing material S30

In the present stage, a material having radicals or functional groups is added to the reactor containing the mixture prepared in the above stage S20, and admixed with the same.

The material having radicals or functional groups may be at least one selected from:

thiophene having a sulfur radical;

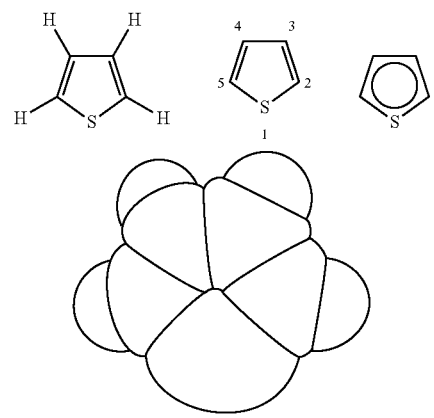

methyl methacrylate having an oxygen radical;

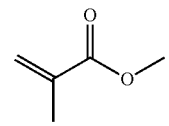

aniline having an amine functional group;

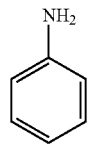

polypyrrole having an NH group as a functional group;

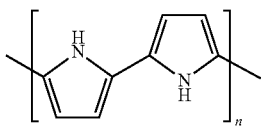

Poly vinylidene fluoride having fluorine as a functional group;

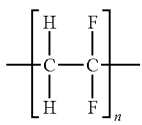

3,4-ethylenedioxythiophene having sulfur and oxygen as functional groups;

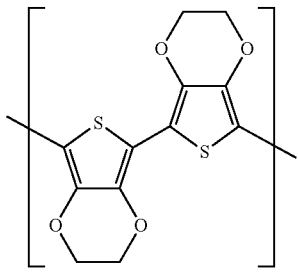

vinylphenol-fluoride having fluoride as a functional group;
Poly vinylpyrrolidone having oxygen and nitrogen as functional groups: and

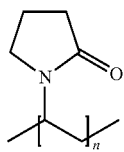

Poly vinylidene fluoride-hexafluoropropylene (PVdF-HFP) having fluorine as a functional group.

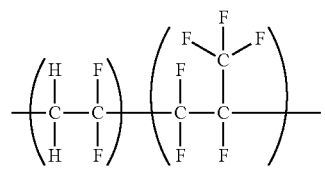

Functional groups of aniline, polypyrrole and acrylamide may be polymerized with or substituted by at least one functional group selected from amine, thiol, sulphonic acid, cyano, Cl, F, carboxylic acid, amide, diazo, phenol, carbonyl, hydroxyl, ether, phosphoryl, nitro, nitroso, azo, nitrile, thioether, thiocarbamate, bisulfate, oxyanion, heterocyclic compounds, 1,10-phenoanthroline complex and alkenes.

An amount of the material having radicals or functional groups typically ranges from 1 to 90 wt. % relative to 10 to 99 wt. % of a total weight of a mixture comprising the solid material and the first organic solvent in the reactor. If the amount is less than 1 wt. %, polymerization is not sufficient. On the other hand, when the amount exceeds 90 wt. %, excessive polymerization occurs, thus causing problems such as pore clogging. Therefore, it is preferable to maintain an amount of the material having radicals or functional groups in the range of 1 to 90 wt. %.

After addition of the material having radicals or functional groups to the reactor, the reactor is maintained under reduced pressure of not more than 80 kpa at ambient temperature for 1 to 10 minutes, followed by agitation using an ultrasonicator at ambient pressure for 10 to 20 minutes.

In this case, if the reduced pressure during agitation using a mechanical agitator as well as the ultrasonicator is maintained for less than 1 minute, dispersion of the material having radicals or functional groups into pores may not be sufficient. On the other hand, if the above time exceeds 10 minutes, the material having radicals or functional groups may block the pores. Therefore, vacuum is preferably maintained for 1 to 10 minutes. Since pore dispersion is not sufficiently executed when the pressure exceeds an absolute pressure of 80 kpa, it is necessary to maintain a vacuum condition, that is, a reduced pressure of not more than 80 kpa.

Moreover, if a time of simultaneously executing ultrasonication and mechanical agitation is less than 10 minutes, degree of dispersion is reduced. When the time exceeds 20 minutes, charging efficiency of the material having radicals or functional groups is deteriorated or dispersion is not further improved. Accordingly, an agitation time preferably ranges from 10 to 20 minutes.

Polymerization using a polymerization initiator S40

The polymerization initiator is introduced into the reactor treated in the above stage S30 and, while maintaining a surface temperature of the reactor at −20 to 100° C., the mixture is subjected to polymerization by ultrasonication at a range of 20 to 300 kHz for 10 minutes to 100 hours.

The polymerization initiator may include, for example, ferric trichloride ($FeCl_3$), aluminum trichloride ($AlCl_3$), aluminum compounds, chromium (III) compounds, organometallic compounds, ammonium persulfate (($NH_4$)$2S_2O_8$), benzoyl peroxide, heteropolyacid catalysts, sodium perborate, Ziegler-Natta catalysts, etc. An amount of the polymerization initiator used in the present invention typically ranges from 1 to 1,000 times a molar ratio of carbon.

For the foregoing polymerization, if a surface temperature of the reactor is less than −20° C., the final product, that is, a desired material may not have a complete morphology depending on a degree of polymerization. When the surface temperature exceeds 100° C., the material may have a modified structure. Therefore, a surface temperature of the reactor may range from −20 to 100° C.

For the polymerization executed in a reactor having a surface temperature of −20 to 100° C., if polymerization is performed for less than 10 minutes, the desired material may not have a complete morphology depending on a degree of polymerization. On the other hand, when the polymerization time exceeds 100 hours, the material may have a modified structure. Therefore, the polymerization time may be kept in the range of 10 minutes to 100 hours.

If the foregoing ultrasonication is executed at less than 20 kHz, polymerization is not smoothly performed. When ultrasonication is performed at more than 400 kHz, a product of the polymerization, that is, a desired material or polymer is collapsed or decomposed. Therefore, ultrasonication may be executed in the range of 20 to 400 kHz.

The foregoing polymerization may be completed by adding acetone in an amount of 0.5 to 20 times an amount of the first organic solvent at ambient temperature and pressure.

Filtration and washing of unreacted residue S50

After completion of the polymerization in the above stage S40, the reaction product is subjected to filtering and washing to remove the polymerization initiator, the unreacted material having radicals or functional groups, and acetone from the reaction product.

The filtering and washing process is performed using a second organic solvent, which includes at least one selected from distilled water, ethanol, isopropyl alcohol, methanol, ether, dimethylchloride, acetonitrile, acetone, chloroform, methylethylketone, toluene, xylene, propanol and n-propyl acetate.

Drying S60

In order to remove the second organic solvent used in the above filtering and washing stage S50, drying is executed at 45 to 55° C. This drying process may be hot air drying in the foregoing temperature range enabling rapid and complete drying, although natural drying is possible.

If a drying temperature is less than 45° C., it is difficult to completely dry the material and drying take a relatively long time. When the drying temperature exceeds 55° C., the polymer may be damaged or transition of the polymer may be caused. Therefore, the drying temperature may range from 45 to 55° C.

A variety of polymer nano-composite materials having radicals or functional groups produced according to the foregoing processes may be employed in various applications other than capturing carbon dioxide. For instance, a material having a radical or functional group in vapor and/or liquid phases may be used for adsorption of heavy metals. The material prepared according to the present invention may also be fabricated in the form of a honeycomb structure, a monolith bed or beads.

By covalent bonding and substitution of a radical or functional group, the material of the present invention may be used for various catalysts applicable to such covalent bonding and/or substitution. In addition, the material of the present invention may be employed in drug delivery systems or drug reservoir materials involving reaction of the material with a variety of organic compounds.

Briefly, by substituting or covalently bonding a radical or functional group of the material, which is present inside or outside pores of a polymer nano-composite material having various radicals or functional groups, with at least one selected from a group consisting of Pt, Pd, Ag, Au, Ni, Fe, Mn, Cr, Ru, Rh, Mo, Ir, Re, W, Al, Mg, Na, K and Ca, which is present in elemental or compound form, the foregoing material may be used as a drug delivery system, a catalyst or an adsorbent.

Moreover, the material having the radical or functional group described above may be applied to fabrication of a $CO_2$ or heavy metal isolation apparatus containing the foregoing adsorbent, which is employed in a process to generate heavy metals as well as $CO_2$.

The foregoing isolation apparatus typically comprises an adsorption bed in which the adsorbent is charged, a heat exchanger to control a temperature of the adsorption bed, and a device to control inflow of gas containing $CO_2$ in the adsorption bed and a flow-path for high concentration $CO_2$ and/or heavy metals generated during a desorption process. The apparatus may further include at least one additional adsorption bed or an alternative device such as a pressure controller, a flow controller, a flow-path controller, a flow rate controller, and the like or, otherwise, may have an internal structure modified according to use of the apparatus.

With regard to the foregoing technical configurations of the present invention, the following two aspects may be further considered.

First, the present invention may provide a method for manufacturing a $CO_2$ separation and heavy metal adsorption agent, a catalyst, a drug reservoir material and/or a drug delivery system, comprising:

mixing a material having radicals or functional groups, which is at least one selected from thiophene, methyl methacrylate, aniline, polypyrrole, vinylidene fluoride, 3,4-ethylenedioxythiophene, acrylamide, vinylphenol-fluoride, vinylpyrrolidone, vinylidene fluoride-hexafluoropropylene (PVdF-HFP), with methanol or acetone to prepare a solution;

applying the prepared solution to a porous carbon and silica support to coat the same and conduct polymerization, and to be supported by the same;

washing the product to remove the unreacted material having radicals or functional groups after completion of the coating, polymerization and supporting processes; and drying the product at 30 to 70° C. under vacuum after the washing process.

Second, the present invention may provide a method for manufacturing a $CO_2$ separation and heavy metal adsorption agent, a catalyst, a drug reservoir material and/or a drug delivery system in a polymer nano-composite form, comprising:

mixing a material having radicals or functional groups, which is at least one selected from thiophene, methyl methacrylate, aniline, polypyrrole, vinylidene fluoride, 3,4-ethylenedioxythiophene, acrylamide, vinylphenol-fluoride, vinylpyrrolidone, vinylidene fluoride-hexafluoropropylene (PVdF-HFP), with methanol or acetone and adding ferric trichloride as a polymerization initiator to the mixture, in order to prepare a solution;

applying the prepared solution to a porous carbon and silica support to coat the same and conduct polymerization, and to be supported by the same;

washing the product to remove the unreacted material having radicals or functional groups after completion of the coating, polymerization and supporting processes; and drying the product at 30 to 70° C. under vacuum after the washing process, wherein the polymer nano-composite is formed by polymerization of a monomer such as polythiophene, poly(methyl methacrylate), polyaniline, polypyrrole, poly(3,4-ethylenedioxythiophene), poly(vinylidene fluoride), polyacrylamide, polyvinylphenol-fluoride, poly(vinylpyrrolidone) or polyvinylidene fluoride-hexafluoropropylene (PVdF-HFP) in pores of meso-porous nano-particles.

A material having radicals or functional groups prepared according to the present invention substantially contains a number of radicals or functional groups per unit mass and apparent solid volume, thereby being used in a broad range of applications involving substitution and reaction of the radicals or functional groups. More particularly, each radical or functional group of the inventive material may comprise a portion to be used for covalent bonding and the other portion to be used for substitution. Alternatively, the whole radical or functional group may be applied to adsorption and isolation of carbon dioxide. The inventive material can be used as a catalyst and/or an adsorbent. For $CO_2$ adsorption according to an embodiment of the present invention, the inventive material exhibits excellent $CO_2$ adsorption owing to numerous radicals or functional groups with binding affinity to $CO_2$ and structural features. In addition, the material exhibits high $CO_2$ selectivity by the radical or functional group, is scarcely influenced by moisture, and may be used as an adsorbent with superior adsorption at a higher temperature, compared to operation temperatures of any conventional adsorbents. The inventive material has a lower desorption temperature than that of an absorbent and even than that of a solid adsorbent, thus enabling rapid switching between adsorption and desorption operations. The inventive material is a solid adsorbent and may also be a chemical absorbent in a solid form to absorb $CO_2$ by covalent bonding of an amine group and $CO_2$, thereby isolating $CO_2$. Therefore, the material of the present invention is substantially a novel solid absorptive adsorbent to simultaneously execute chemical absorption and physical adsorption.

When the present material is applied to a $CO_2$ separation process, excellent operation effects are attained and disadvantages of conventional chemical absorption methods using amines and adsorption methods using a solid adsorbent are overcome, in turn enabling smooth operation of an economical isolation process. Therefore, the present invention may successfully separate $CO_2$ (a leading cause of global warming) and, when applied to small-scale indoor $CO_2$ separation, provide a clean and healthy indoor environment.

Furthermore, an adsorbent of the present invention contains radicals or functional groups present on a surface of carbon and silica and in pores thereof, wherein the carbon and silica are known to be nontoxic wherein the radicals or functional groups may be used in various applications. By covalently bonding the radicals or functional groups to ingredients of medicines or cosmetics, the inventive material may be used in preparation of timed-release medicines and/or drug reservoir materials. Moreover, the inventive material may also be applied to a variety of catalysts such as a catalyst for a fuel cell wherein radicals or functional groups of the material are substituted by other ingredients of the catalyst.

The material of the present invention may be used to prepare various catalysts and/or drug delivery systems. Since the inventive material can adsorb and isolate $CO_2$ as a greenhouse gas and heavy metals, efficiently desorb the same to remove high concentration $CO_2$ and heavy metals. Accordingly, the present invention effectively traps $CO_2$ generated from large capacity $CO_2$ generation sources, thus ultimately preventing global warming. In addition, the present invention can reduce heavy metal contamination of indoor air so as to provide a clean and healthy indoor environment.

The foregoing technical configurations will be more concretely described in the following examples.

Example 1

Preparation of Meso-Porous Carbon Thiophene Polymer (Thiophene Meso-Porous Carbon)

1 g of meso-porous carbon (CMK-3) with a specific surface area of 1,099 m2/g, a fine pore volume of 1.073 m3/g and a fine pore diameter of 4.84 nm was placed in a reactor at ambient pressure and dried at ambient temperature and ambient pressure.

Then, 25 cc of acetonitrile [Aldrich Chemical, US] was added to the dried meso-porous carbon, followed by admixing the same using an ultrasonicator for 15 minutes, to uniformly disperse acetonitrile in pores of meso-porous carbon. Following this, 0.5 g of thiophene was added to the dispersion and the mixture was maintained under vacuum at an absolute pressure of 30 kpa for 3 minutes, followed by ultrasonication at ambient pressure for 15 minutes and then mechanical agitation for 15 minutes, respectively, so as to prepare a homogeneous dispersion.

Next, 4 g of ferric trichloride [Aldrich Chemical, US] was added to the foregoing dispersion and the mixture was subjected to ultrasonication induced polymerization for 1 hour while maintaining a surface temperature of an atmospheric reactor at 5° C. After completion of the polymerization, 20 cc of acetone [Aldrich Chemical, US] was added to the reaction product in order to terminate the polymerization and the used catalyst, that is, ferric trichloride and thiophene were filtered from the product.

After the filtering process, 10 cc of methanol [Aldrich Chemical, US] was added to the product to separate the reaction product as a desired material of the present invention, and to remove unreacted residues, ferric trichloride used as the catalyst and the solvent. In order to isolate the foregoing materials in pure form, acetone [Aldrich Chemical, US] was used for washing and filtering during the separation process.

The filtered material was dried using a vacuum dryer at 50° C. for 1 hour, in order to completely remove the organic solvent. FIG. 1 shows a shape of the material prepared according to the foregoing processes.

Example 2

Preparation of Meso-Porous Silica Thiophene Polymer (Thiophene, Meso-Porous Silica KIT-6)

A desired material was obtained by the same procedures as described in Example 1 except that the meso-porous carbon was replaced with meso-porous silica KIT-6.

Example 3

Preparation of Meso-Porous Silica Thiophene Polymer (Thiophene, Meso-Porous Silica MCM-41)

A desired material was obtained by the same procedures as described in Example 1 except that the meso-porous carbon was replaced with meso-porous silica MCM-41.

Example 4

Preparation of Meso-Porous Silica Thiophene Polymer (Thiophene, Meso-Porous Silica SBA-15)

A desired material was obtained by the same procedures as described in Example 1 except that the meso-porous carbon was replaced with meso-porous silica SBA-15.

Example 5

Preparation of Meso-Porous Carbon Aniline (Aniline, Meso-Porous Carbon)

A desired material was obtained by the same procedures as described in Example 1 except that thiophene [Aldrich Chemical, US] was replaced with aniline [Aldrich Chemical, US].

Example 6

Preparation of Meso-Porous Silica Thiophene Polymer (Thiophene, Amine Grafted Meso-Porous Silica)

A desired material was obtained by the same procedures as described in Example 1 except that the meso-porous carbon was replaced with meso-porous silica and amine-grafted silica was used to increase adhesion of thiophene polymer present in pores to a silica wall.

Example 7

Preparation of Meso-Porous Silica Aniline Polymer (Aniline, Meso-Porous Silica)

A desired material was obtained by the same procedures as described in Example 1 except that thiophene [Aldrich Chemical, US] was replaced with aniline [Aldrich Chemical, US] and the meso-porous carbon was replaced with meso-porous silica.

For the material according to the present invention, a support is made of a material with a large surface area and a large pore size, such as silica, carbon, etc. Whereas an amount of thiophene supported on a surface of the silica in an aerogel form having a large surface area but a small pore size is relatively small, effects of supporting thiophene in pores of the support are increased. As such, meso-porous silica or meso-porous carbon is particularly preferable among different types of silica used for the support. On the other hand, for carbon materials, meso-porous carbon or carbon nanotubes are more effective.

The radical or functional group contained in pores of the silica and carbon and/or supported on the surface thereof may be preferably derived from thiophene. For instance, the inventive material having a sulfur radical wherein this sulfur radical is supported on the silica support prepared as described above, may be used to $CO_2$ adsorption using the sulfur radical. The above material exhibits better performance as a $CO_2$ adsorbent than a zeolite molecular sieve which is currently known to be the best $CO_2$ adsorbent at 25° C. and ambient pressure. Meanwhile, the inventive material completely desorbs $CO_2$ at 105° C., which is a lower temperature than a $CO_2$ desorption temperature of an absorbent comprising amine. Moreover, the inventive material may be used as a superior adsorbent for $CO_2$ isolation capable of completely desorbing $CO_2$ at a very low temperature, compared to zeolite. Additionally, the inventive material may be used as a base material for preparation of a substance having different functional groups, so as to enable manufacturing of medicines and/or cosmetics.

The inventive material containing maximum radicals or functional groups per unit weight may be employed in a broad range of applications. For instance, if the material is used as an adsorptive separation agent for $CO_2$, an adsorption temperature may range from 0 to 50° C. while a desorption temperature may range from 90 to 110° C.

Experimental Example 1

Several fixed bed reactors, each made of stainless steel SUS316 having an inner diameter of 4 mm, were prepared. In order to determine performance of a sulfur radical contained in the material prepared in each of Examples 1 to 7, the material is placed in each of the fixed bed reactors. The material in the reactor was subjected to measurement of adsorbent performance and reactivity of the sulfur radical contained in the material.

As a subject material to be introduced into the fixed bed reactor and to be adsorbed, a gas containing 15.2% $CO_2$ was fed into the reactor at a constant flow rate of 5 cc/mm.

The present experiment was performed by measuring a concentration of $CO_2$ at an exit of the fixed bed reactor while supplying 15.2% $CO_2$ gas into the fixed bed reactor and maintaining the temperature at 25° C., so as to determine a $CO_2$ adsorption amount. The foregoing experiment was repeated at various temperatures in the reactor, in order to determine variation in $CO_2$ adsorption depending on temperature. As a result, it was identified that the $CO_2$ absorption amount is 25 wt. parts relative to weight of the absorbent.

Figure 2:
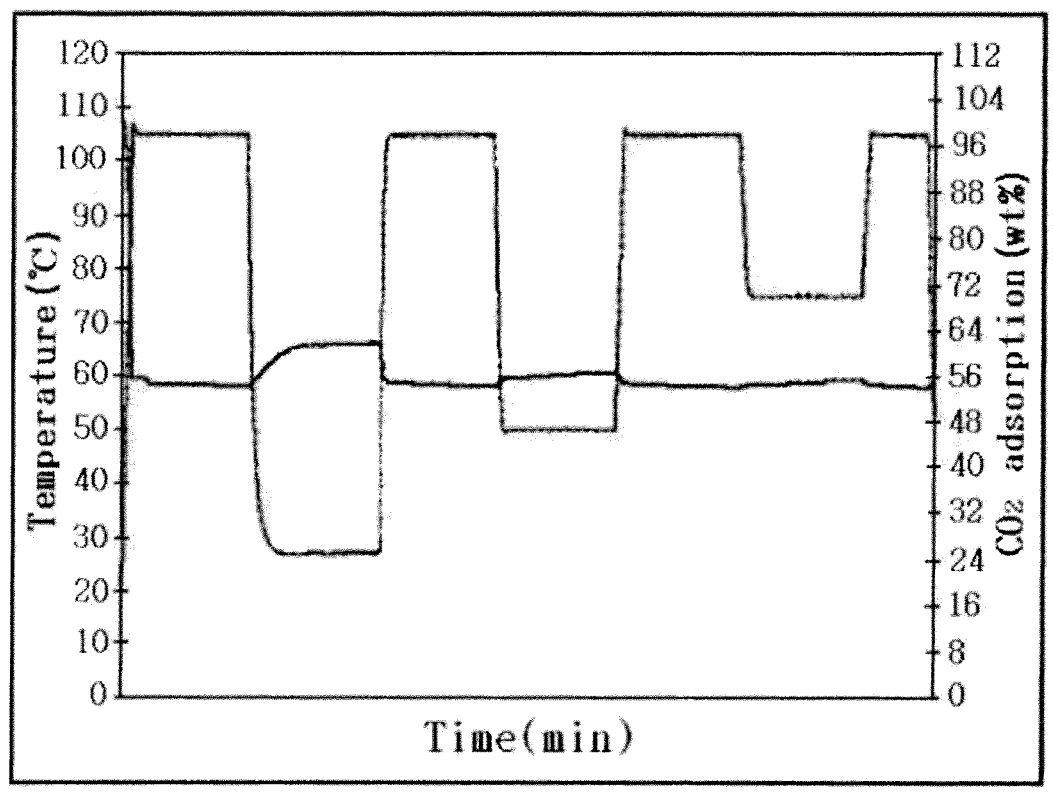
FIG. 2 is a plotted graph illustrating $CO_2$ adsorption ability by a sulfur radical of the material prepared by the method for preparation of a meso-porous polymer nano-polymerized composite material according to the present invention.
Figure 3:
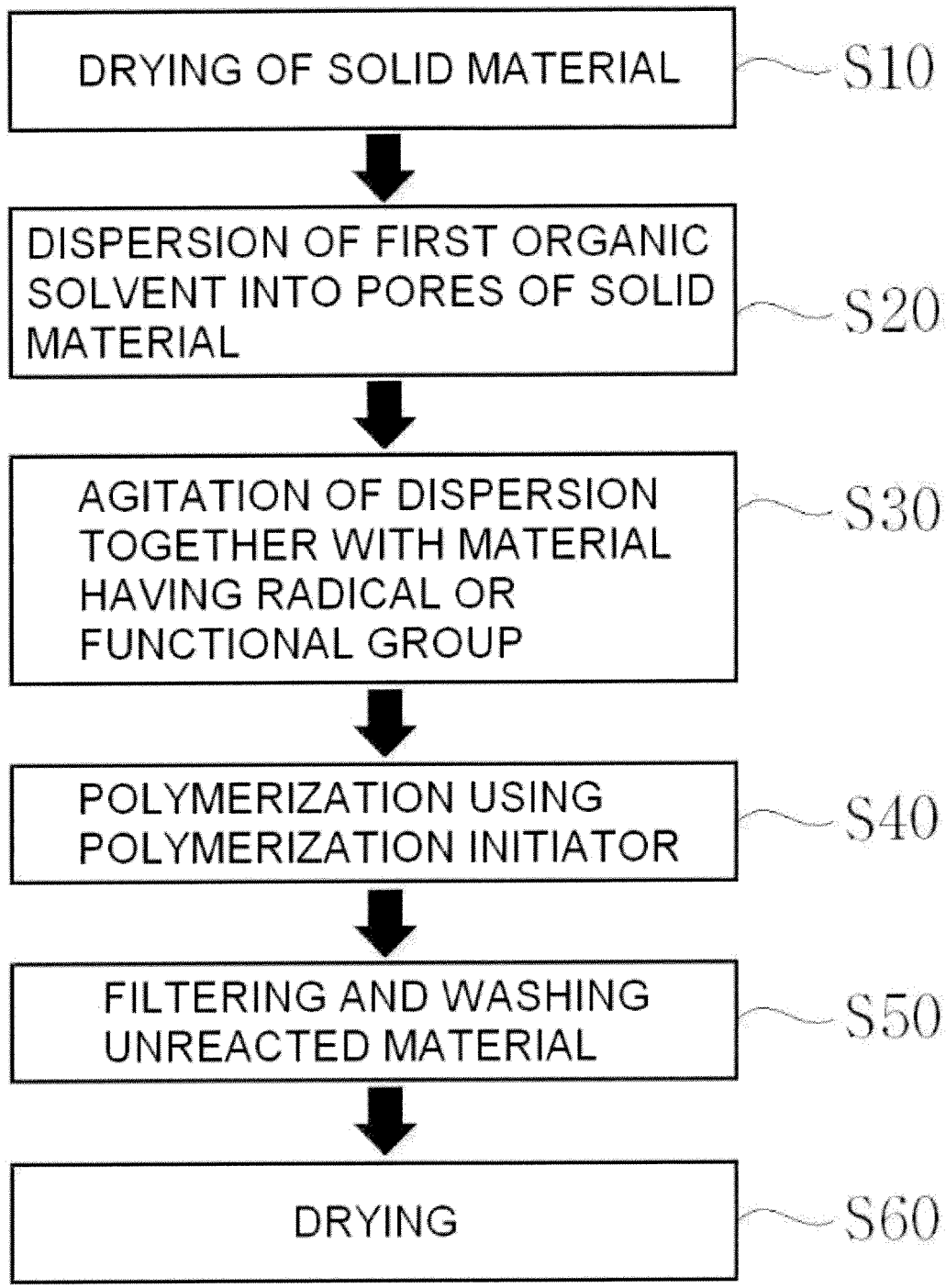
FIG. 3 is a flow diagram illustrating the method for preparation of a meso-porous polymer nano-polymerized composite material according to the present invention.

Such experimental results are illustrated in FIG. 2.

From FIG. 2, it can be seen that the material of the present invention adsorbs a large amount of $CO_2$, and this means that the inventive material contains numerous radicals or functional groups and has pores with at least a size sufficient to preferably disperse $CO_2$ in the pores.

As described above, those skilled in the art will appreciate that various exemplary embodiments other than the embodiments of the present invention disclosed herein are possible without altering technical concepts and/or essential features of the invention. Therefore, it is duly appreciated that the foregoing examples are proposed only for illustrative purposes and do not limit the present invention.

It should be understood that the invention includes all modifications, additions and substitutions derived from the scope and spirit of the invention as disclosed in the appended claims and equivalents thereof, rather than the foregoing detailed description.

The invention claimed is:

1. A method for preparation of a meso-porous polymer nano-polymerized composite material, comprising:
   a. drying a solid material having pores under vacuum at ambient temperature and pressure (S10);
   b. adding 50-99.8 wt. % of a first organic solvent to 0.2-50 wt. % of the vacuum dried solid material and dispersing the first organic solvent into pores of the solid material using an ultrasonicator, in order to remove air while wetting a surface of the solid material with the first organic solvent (S20);
   c. adding 1-90 wt. % of a material having radicals or functional groups to 10-99 wt. % of the mixture containing the solid material and the first organic solvent in a reactor, which was prepared in the above step S20, and agitating the mixture for 10 to 20 minutes (S30);
   d. introducing a polymerization initiator into the reactor containing the mixture prepared in the above step S30 in order to initiate polymerization of the mixture for 10 minutes to 100 hours while maintaining a surface temperature of the reactor at 20-100° C. (S40);
   e. using a second organic solvent to filter and wash the reaction product after completion of the polymerization, in order to remove the unreacted material having radicals or functional groups as well as the polymerization initiator from the product (S50); and
   f. drying the treated product to eliminate the second organic solvent from the same after removal of the unreacted material having radicals or functional groups as well as the polymerization initiator (S60).

2. The method according to claim 1, wherein the solid material having pores is at least one selected from silica, carbon materials, a zeolite molecular sieve, alumina and zirconia.

3. The method according to claim 1, wherein the first organic solvent is at least one selected from acetonitrile, acetone, chloroform, dimethylchloride, methylethylketone, methanol, toluene, xylene, isopropyl alcohol, propanol, n-propyl acetate and ether.

4. The method according to claim 1, wherein the material having radicals or functional groups is at least one selected from thiophene, methyl methacrylate, aniline, polypyrrole, vinylidene fluoride, 3,4-ethylenedioxythiophene, acrylamide, vinylphenol-fluoride, vinylpyrrolidone, vinylidene fluoride-hexafluoropropylene (PVdF-HFP).

5. The method according to claim 1, wherein the second organic solvent is at least one selected from distilled water, ethanol, isopropyl alcohol, methanol, ether, dimethylchloride, acetonitrile, acetone, chloroform, methylethylketone, toluene, xylene, propanol and n-propyl acetate.

6. The method according to claim 1, wherein the polymerization is performed using at least one polymerization initiator selected from ferric trichloride, aluminum trichloride, aluminum compounds, chromium (III) compounds, organometallic compounds, ammonium persulfate, benzoyl peroxide, heteropolyacid catalysts, sodium perborate and Ziegler-Natta catalysts by ultrasonication at 20 to 400 kHz for 10 minutes to 100 hours.

7. The method according to claim 1, wherein the polymer nano-composite material having radicals or functional groups is useable as a drug delivery system, a catalyst or an adsorbent by substituting or covalently bonding a radical or functional group of the material, which is present inside or outside pores of the composite material having various radicals or functional groups, with at least one selected from a group consisting of Pt, Pd, Ag, Au, Ni, Fe, Mn, Cr, Ru, Rh, Mo, Ir, Re, W, Al, Mg, Na, K and Ca, which is present in elemental or compound form.

* * * * *